United States Patent Office 2,700,831
Patented Feb. 1, 1955

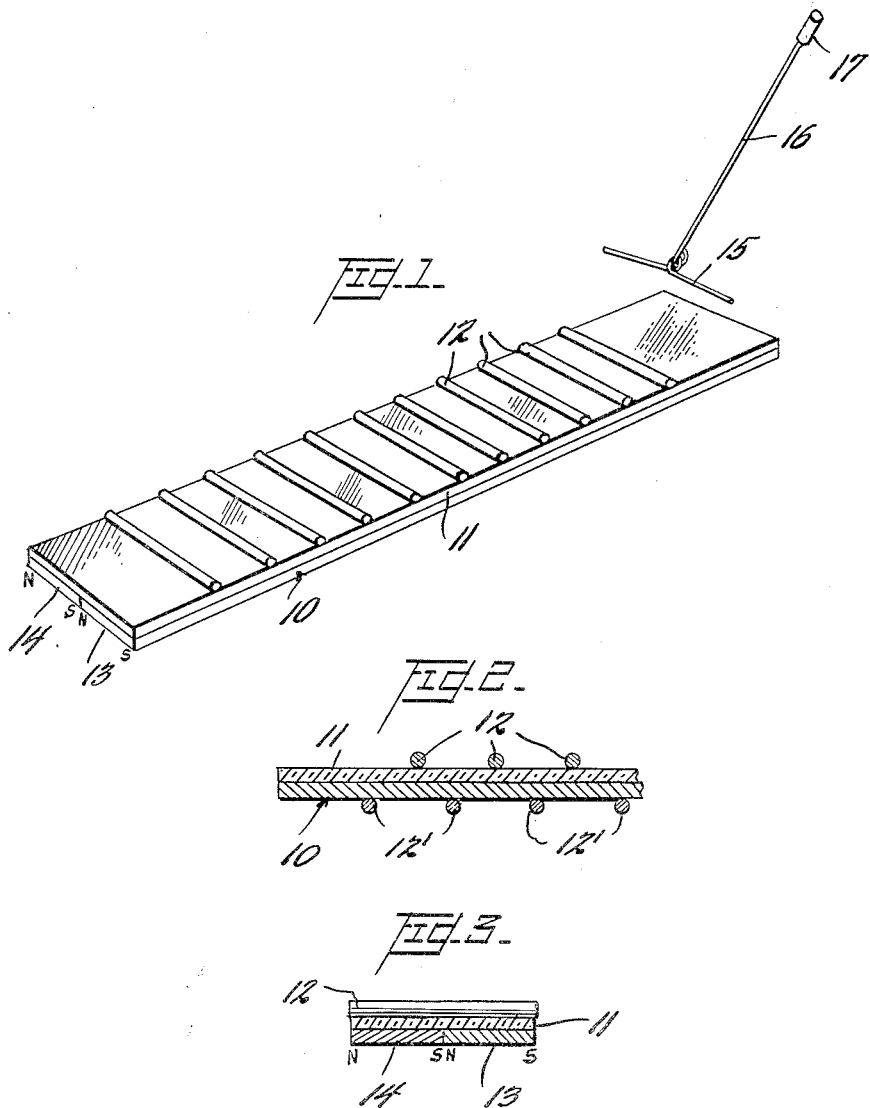

2,700,831

MAGNETIC FORCE DEMONSTRATION DEVICE

Nicolaus P. Mathiesen, Danby, Vt.

Application April 3, 1953, Serial No. 346,703

4 Claims. (Cl. 35—19)

This invention relates to educational apparatus and more particularly to a device for demonstrating certain aspects of the force of magnetism.

The primary object of the invention is the provision of a device comprising a permanent magnet having a flat surface bounded by two parallel or substantially parallel edges, the magnet being polarized transversely so that one of said edges constitutes an elongated north pole and the other an elongated south pole, in combination with a plurality of cylindrical rods or members of magnetic material which are placed in juxtaposition to the aforesaid flat surface, whereupon the several cylindrical members will dispose themselves in accordance with three laws of magnetic force, i. e. they will align themselves with the field of the permanent magnet, they will of course be strongly attracted to the magnet and, lastly, through a repulsion effect caused by the respective fields induced in the several cylindrical members, they will space themselves along the elongated field of the permanent magnet, strongly resisting any effort to group them together or to narrow the spacing between them.

A further object is the provision, in combination with a device such as described, of a separate piece of apparatus consisting of an attenuated member of magnetic material loosely articulated with a handle of non-magnetic material by means of which the attenuated member may be supported in variable relation to the permanent magnet in order to demonstrate how the attenuated member will align itself with the lines of force comprising the field of the permanent magnet.

Another object is the provision, in a device such as described, of a layer of flat non-magnetic material separating the aforesaid cylindrical members from the permanent magnet and providing, without the necessity of machining, a perfectly smooth surface on which the cylindrical members may roll or slide with a minimum of friction in aligning themselves in the magnetic field as previously mentioned.

Other and further objects, features and advantages will be apparent from the following detailed description, taken in connection with the accompanying drawings in which:

Figure 1 is a perspective view of a device constructed in accordance with the present invention;

Figure 2 is a fragmentary vertical longitudinal section of the device, illustrating the cylindrical members in a different arrangement from that shown in Figure 1; and Figure 3 is a transverse vertical section of the device.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to the drawings, an apparatus embodying the present invention comprises a permanent magnet 10, a layer of non-magnetic material 11, preferably glass, adhered to the upper surface of the magnet 10 and itself having a perfectly smooth and flat surface, and a plurality of thin cylindrical members 12 of magnetic material, for example soft iron, disposed on the upper surface of the glass layer 11. For convenience in manufacture the magnet 10 may comprise two similar magnetized pieces 13 and 14 joined edgewise as illustrated. The pieces 13 and 14 are each magnetized transversely so that each has an elongated north pole at one longitudinal edge and an elongated south pole at the opposite edge, and are joined in magnetic series, that is, with the north pole of one in contact with the south pole of the other so that their respective magnetic forces are in additive relationship, with an elongated north pole extending along one edge of the combined magnet, and an elongated south pole extending along the opposite edge thereof. A single magnetized piece may be used, but since magnets of this general character are more readily available in relatively narrow widths and since for convenience in handling the device a wider width is preferable, it is preferred to use two strips or pieces of material as shown. The glass layer 11 is secured to one flat surface of the magnet 10 by means of any suitable adhesive. The cylindrical members 12 may consist of short lengths of soft iron wire and, as shown, are of length substantially equal to the width of the magnet 10.

The arrangement in which the members 12 will naturally dispose themselves, when the magnet is resting on a horizontal surface, is that illustrated in Figure 1. The members 12 will naturally tend to align themselves with the magnetic lines of force, i. e., transversely of the magnetic strip 10, and will lie closely against the surface of the glass strip 11 without actually adhering thereto. Mechanically they are, of course, entirely free to roll along the glass 11 and, due to the magnetic field induced in each of the members 12, in which like poles will be induced at the corresponding end of each member, the several members 12 will be subject to a mutual repulsion effect which will cause them to space themselves along the device as illustrated. The amount of space between each adjacent pair of members 12 will of course depend upon the total number of members 12 and the strength of the magnetic fields induced in them.

A slightly different aspect of the mutual repulsion effect is illustrated in Figure 2, in which some of the members 12 have been disposed on the opposite face, or bottom of the magnet 10. These cylindrical members, designated as 12' in Figure 2, will space themselves along the magnet 10 due to the aforesaid mutual repulsion effect, and the members 12 resting on the glass 11 will space themselves in staggered relation with the members 12', as shown, due to the mutual repulsion effect existing between the members 12 and also between the members 12 and 12'. A variety of additional interesting arrangements of the members 12 may be effected by varying the attitude of the magnet, as by elevating one or the other end thereof, or by disposing varying numbers of the elements along opposite faces of the device.

The invention also contemplates a supplementary piece of equipment comprising an attenuated member 15 of magnetic material loosely articulated, as by means of a hook and eye arrangement with a handle or support 16 of a non-magnetic material. The handle may, for convenience, be provided with a short finger grip portion 17 of larger diameter. When the attenuated member 15 is supported in proximity to the magnet 10, it will align itself with the magnetic lines of force comprising the field of the magnet. If placed in a median position, such as illustrated in Figure 1, the member 15 will be disposed substantially parallel to the upper surface of the magnet 10. As the midpoint of the member 15 is moved toward either pole of the magnet, that end of the member 15 nearest the pole toward which it is being moved will dip, thus visually demonstrating the orientation in space of the lines of force comprising the magnetic field. Other visual demonstrations may be performed with the aid of the above described supplementary equipment.

Having thus described the invention, what is claimed as new and desired to be secured by Letters Patent is:

1. Magnetic force demonstration device comprising a permanent magnet having a flat surface at least two edges of which are parallel, said magnet having an elongated north pole extending along one of said edges and a corresponding south pole extending along the other of said edges, and a plurality of cylinders of magnetic material extending substantially parallel to each other in the field of said magnet, said cylinders being mutually spaced apart by induced magnetic repulsion.

2. Magnetic force demonstration device according to claim 1, including a layer of non-magnetic material secured to said surface and spacing said cylinders from said surface, said layer having a smooth flat outer surface.

3. Magnetic force demonstration device according to claim 1, said magnet taking the form of a thin, flat, elongated member magnetized transversely of its length and parallel with its said flat surface.

4. Magnetic force demonstration device according to claim 3, said member comprising two thin flat bars magnetized transversely of their longer dimensions and joined edgewise along their respective edges of unlike polarity.

References Cited in the file of this patent

UNITED STATES PATENTS

| 824,812 | Plimpton | July 3, 1906 |
| 2,458,970 | Wilson | Jan. 11, 1949 |

OTHER REFERENCES

"A Text Book of Physics," by L. B. Spinney, 3rd edition; published in 1925 by the MacMillan Co., New York; pages 265, 266.